United States Patent

Harris et al.

[11] 3,729,414
[45] Apr. 24, 1973

[54] DEWAXING AND DEOILING PROCESS

[75] Inventors: Robert E. Harris; William R. Moseley, both of Beaumont, Tex.

[73] Assignee: Mobil Oil Corporation, New York, N.Y.

[22] Filed: Aug. 16, 1971

[21] Appl. No.: 171,930

[52] U.S. Cl. ..................................210/66, 210/217
[51] Int. Cl. .............................................B01d 37/00
[58] Field of Search .........................210/66, 67, 217

[56] References Cited

UNITED STATES PATENTS

| | | | |
|---|---|---|---|
| 949,724 | 2/1910 | Bebbington | 210/217 |
| 1,059,327 | 4/1913 | Akins | 210/217 |
| 2,484,304 | 10/1949 | Long et al. | 210/66 X |
| 3,215,277 | 11/1965 | Miles, Jr. | 210/217 |
| 3,491,885 | 1/1970 | Hazard | 210/217 |

Primary Examiner—Samih N. Zaharna
Attorney—Oswald G. Hayes et al.

[57] ABSTRACT

In a rotary filter dewaxing-deoiling process, the method and apparatus for improving the deoiling of the wax cake is described, characterized by utilizing a plurality of transverse solvent distributor pipes each of which dispense a relatively dense transverse curtain of solvent droplets on the wax cake thereby providing areas of solvent flooding interspaced with areas of considerably reduced solvent concentration.

3 Claims, 3 Drawing Figures

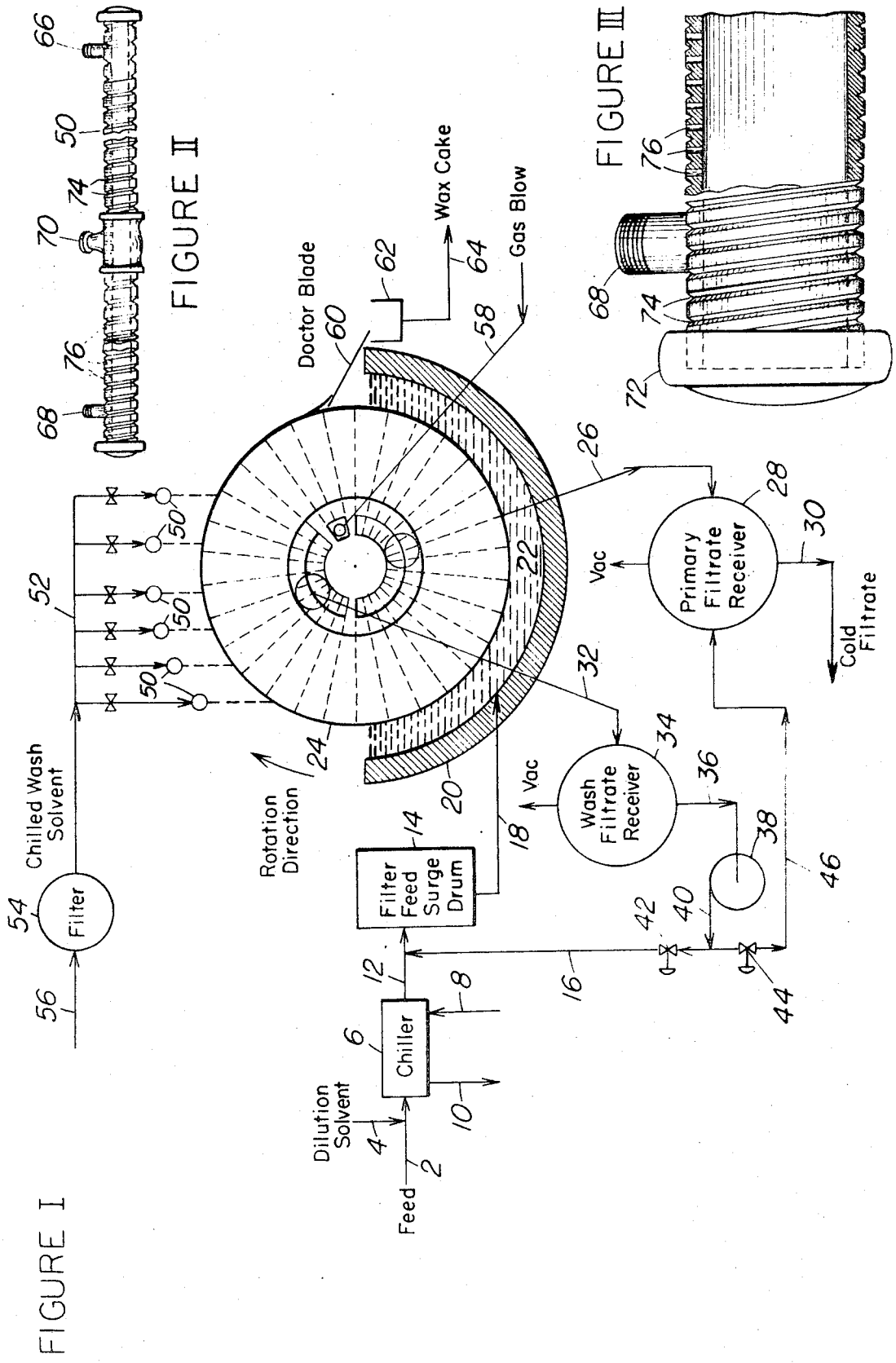

DEWAXING AND DEOILING PROCESS

BACKGROUND OF THE INVENTION

Waxes present in lubricating oil distillates are known to have about the same boiling point as an oil fraction and therefore they cannot be separated and removed simply by distillation. In the early dewaxing procedures, the wax was crystallized by slow cooling and separated from the oil by filtering, decanting, centrifuging etc. The earliest process for this purpose was practiced in the oil fields and was called cold settling. That is, waxy distillates stored in tanks outdoors were chilled during the winter months whereby wax crystals were formed and settled to the tank bottom permitting a dewaxed oil to be recovered from the top of the tank. A later dewaxing process applied to light lube distillates involved slowly cooling the oil and filtering the resulting wax crystals from the oil by means of plate and frame filters at an elevated pressure. In the case of oils of high wax content, the chilling and filtering procedures were repeated at successively lower temperatures until an oil of desired pour point was reached.

The first commercial dewaxing process using organic solvents was installed in 1927 and employed a mixture of acetone and benzol. This process has been improved by replacing acetone with methyl ethyl ketone and all or part of the benzol has been replaced with toluene. This process is the most widely used process today and is known as the MEK process. In the MEK process, waxy distillates or deasphalted residua most usually, after effecting solvent extraction thereof, are diluted with two to four volumes of solvents, chilled and filtered continuously. The solvent is recovered from both the dewaxed oil filtrate and the slack wax by distillation. In this procedure, the waxy oil charge diluted with solvent is heated at 10° to 50°F. above the cloud point of the mixture being processed to insure that all wax crystals are dissolved in a true solution. The mixture is then cooled by exchange with water, with cold filtrate and finally with ammonia or other refrigerant material. Once the wax crystal is formed, it is necessary to cool the mixture in scraped exchangers to ensure satisfactory heat transfer and to prevent the wax from building up on the walls of the exchanger. Additional solvent is generally introduced to the mixture at one or more locations in the chilling train. The slurry thus obtained is chilled and filtered at a temperature of 10° to 20°F. below the desired finished oil pour point. From the chillers the slurry is discharged into a filter feed tank and therefrom it is passed to an enclosed continuous rotary vacuum filter or filters. The filtrate is collected in filtrate receivers, one receiver for primary filter and another receiver for wash filtrate. Oil is recovered from the filtrate by distillation and usually a final steam stripper is used to remove traces of solvent. The wax cake collected on the continuous rotary vacuum filter is washed with solvent to displace oil from the wax cake before the wax is discharged from the filter. In plants that produce refined wax, the wax cake from two or three primary filters is combined, mixed with freshly chilled solvent and refiltered in an additional filter at the same temperature as the primary filters. This operation is known as "repulping" and it increases dewaxing yield by substantially further reducing the oil content of the slack wax. Double repulping is sometimes practiced where it is desirable to produce a wax containing very small amounts of oil.

THE INVENTION

This invention relates to the method and apparatus for improving a continuous rotary filter dewaxing and deoiling process. In a more particular aspect the present invention is concerned with the method and means for effecting improved deoiling of the wax cake accumulated on a continuous rotary vacuum filter. In another aspect the present invention is concerned with the method and means for distributing solvent on the wax cake so as to displace the oil content of the wax with the solvent in greater efficiency.

In the method of this invention it has been found that a vastly improved result can be obtained in deoiling the slack wax cake by distributing the chilled solvent across the wax cake as a relatively continuous curtain of fine droplets and employing a plurality of curtains of fine droplets spaced apart from one another a sufficient distance to obtain a substantially continuous film of chilled solvent across the surface of the slack wax cake as the rotary filter rotates. More particularly, in the method of the present invention, the rotary filter is partially submerged in the chilled oil-wax slurry feed and the wax accumulates upon the surface of the filter by establishing a reduced pressure on the inside of the filter. As the filter rotates a slack wax cake is built up on the submerged surface and as the submerged surface leaves the pool of oil-wax slurry or mixture it is then contacted with chilled wash solvent for the purpose of displacing oil retained in the slack wax.

In the method of this invention the emerged slack wax cake is caused to come in contact with chilled wash solvent in progressive increments comprising a curtain or dense plane of fine droplets horizontally traversing the rotary filter in a plane with its axis of rotation prior to the wax cake being subjected to gas below to dislodge it from the filter surface and removal by a scraper referred to as a "doctor blade."

In essence, the method of the present invention is concerned with replacing the prior spray nozzle technique of contacting chilled solvent with the wax cake with a more efficient arrangement comprising a plurality of solvent distributor tubes or headers which will form a plurality of spaced apart and relatively dense transverse curtains of fine droplets of solvent falling by gravity in contact with the slack wax cake. This method of bringing the chilled solvent in contact with the slack wax has been unexpectedly responsible for obtaining considerably improved yields of deoiled wax cake and of greater deoiled uniformity across the total length of the wax cake. In the method and arrangement of apparatus of this invention, it is postulated that the several continuous curtains of fine droplets falling in contact with the slack wax operate in conjunction with the established pressure differential between the exterior and interior of the filter to effect a more uniform displacement of the oil retained by the wax. Furthermore, the more uniform distribution of solvent as a falling curtain of fine droplets eliminates disrupting the slack wax cake with any high velocity streams of solvent or otherwise disturbing the slack wax cake and this markedly improves the deoiling efficiency of the system and method of this invention.

In the method and means of the present invention, the chilled solvent is distributed preferably horizontally and transversely across the wax cake in a plane commensurate with the axis of rotation of the filter by a plurality of solvent distributing means or headers of a construction which will produce a falling curtain of relatively fine droplets in such density as to resemble a continuous curtain of solvent. To provide the relatively continuous curtain of fine droplets in accordance with this invention, the solvent distributor means may comprise a number of different arrangements. One suitable arrangement contemplated comprises long tubes which are spaced above the wax cake a distance selected from within the range of 2 to 12 inches. Each tube may be separately vertically adjusted so as to maintain the tubes horizontal. The tubes are grooved on the periphery thereof to form V grooves obtained as by threading the surface thereof with pipe thread which are about one-sixteenth inch in depth and on a ¼ inch pitch. Solvent feeding holes are drilled only in the top side of the distributor pipe or tube intermediate or within each groove so that the holes will all be in the same top dead center plane of the tube and thus will supply fluid to each groove uniformly for flow around the periphery of the pipe to form droplets at the bottom thereof. Means are also provided for filtering the chilled wash solvent passed to each of said distributor pipes. It is important that the solvent be filtered to remove rust particles or other solids which might plug the small solvent feeding holes in the pipe or header. Chilled fluid may be added to each end of the distributor pipe or in combination with a central location for very long pipes to assure adequate low velocity solvent supply to all of the holes in each distributor pipe. In any event, it is intended that the solvent supply holes positioned either in the bottom of the groove or on the flat surface intermediate the grooves and on the top surface of each distributor pipe act not as spray nozzles for the solvent. On the other hand, the holes are for the purpose of supplying solvent to each groove in an amount so that solvent passing through the hole will flow down around the pipe and be dislodged therefrom as a stream of small droplets of solvent liquid which will fall by gravity as a curtain of droplets onto the surface of the wax cake positioned beneath the distributor pipes. In a specific arrangement satisfying the concept and method of this invention, six solvent distributor means such as pipes grooved about the periphery thereof with solvent supply holes provided in the top of the pipe intermediate each groove are positioned across the wax cake transversely and spaced apart from one another so that the ascending cake of wax on the rotating filter will pass through and come in contact with four curtains of solvent droplets and two curtains of solvent droplets as the wax cake moves past top dead center and descends to the doctor blade. Of course more or less solvent distributor pipes may be employed than the arrangement above specifically identified, it being important to ensure that an adequate amount of solvent contact the slack wax cake in the manner herein identified.

Having thus generally described the improved method and means of the present invention, reference is now had to the drawings which represent particular embodiments of the present invention.

FIG. 1 diagrammatically shows a portion of a dewaxing process scheme for accomplishing separation of wax crystals from an oil-wax slurry by a rotary wax filter and deoiling of the separated slack wax cake.

FIG. 2 diagrammatically shows a distributor pipe used in the process of FIG. 1 for distributing solvent fluid as a curtain of fine droplets onto the surface of the wax cake.

FIG. 3 diagrammatically shows details of a portion of the distributor pipe shown in FIG. 2.

Referring now to FIG. 1 by way of example, a chilled slurry feed comprising an oil-wax slurry is introduced by conduit 2 and combined with solvent comprising MEK (methyl-ethyl-ketone) introduced by conduit 4. The slurry mixture thus formed is passed through a chiller 6 to which refrigerant is added by conduit 8 and removed by conduit 10. Chiller 6 represented in the drawing is one of a sequence of chillers as used in the prior art to cool the oil-wax slurry down to a desired temperature, as explained above. The chilled wax-oil slurry is passed by conduit 12 to a filter feed receiver drum 14. Additional cold wash filtrate obtained, as hereinafter described, may be added to the slurry in conduit 12 by conduit 16. The chilled slurry is passed from drum 14 by conduit 18 to a tank 20 containing a rotary filter 24 and liquid slurry 22 to be dewaxed. It will be recognized that the filter shown, tank and other equipment are purely diagrammatic and the details of such a rotary filter are well known in the prior art.

Rotary filter 24 is similar to that known and used in the prior art for many years. It comprises a plurality of segmented compartments extending radially from the axis of the filter to the periphery thereof with each peripheral surface comprising a chord of the filter and provided with a porous membrane or foraminous member upon which a slack wax cake is formed and through which oil and solvent is drawn by establishing a negative pressure within the filter segment. In operation the rotary filter is partially submerged in the oil wax slurry up to about 50 percent. In the arrangement of FIG. 1, the filter rotates in a clockwise direction. In this operation each peripheral segment of the filter accumulates a layer of wax known as slack wax. As the filter moves through the container of oil-wax slurry a negative pressure within the filter causes oil and solvent to be collected within the filter and this liquid is removed by conduit 26 diagrammatically shown on the drawing. The oil and solvent collected and withdrawn by conduit 26 is passed to a primary filtrate receiver 28 from which cold filtrate is withdrawn by conduit 30. A vacuum is maintained on primary filtrate receiver drum 28. The cold filtrate removed by conduit 30 may be used to chill the feed passed to the process in a separate chiller not shown and in a manner known in the prior art prior to separating the filtrate as by fractionation.

In the arrangement of FIG. 1, the filtrate rotates in a clockwise direction and as it emerges in an ascending direction the oil phase is removed from the wax. This removal of oil from the wax cake is facilitated by the addition of carefully controlled amounts of wash solvent comprising MEK solution, as herein defined, being distributed so as to partially flood the wax cake in a relatively restricted region. The solvent on the wax cake in cooperation with a pressure differential established between the exterior and the interior of the rotating filter displaces the coil from the porous wax cake. The displaced oil and solvent is collected within the filter and removed as by conduit 32 for passage to a receiver 34 maintained under vacuum similarly to container 28. The wash filtrate collected in drum 34 is withdrawn by conduit 36 for reuse in the process. The wash filter in conduit 36 is pumped by pump 38 through conduit 40 communicating with conduit 16 and conduit 46. The wash filtrate may be passed through conduit 16 containing valve 42 for admixture with the oil-wax slurry in conduit 12. Wash filtrate may also be passed by conduit 46 containing valve 44 to the primary filtrate receiver drum 28.

In the method of this invention, the ascending wax cake on rotary filter 24 is brought in contact with a plurality of transverse falling droplets representing a curtain of fine droplets of chilled wash solvent, which curtain provides a volume of wash solvent over the slack wax cake on contact to cause a restricted flooding thereof for displacing oil retained in the wax. In the area intermediate the falling curtain of solvent droplets, the concentration of solvent is considerably reduced.

In the method and arrangement represented by FIG. 1, there are provided six curtains of wash solvent droplets contacting the wax cake with four of the curtains being located on the ascending side of the rotating filter and two of the curtains being positioned beyond top dead center and on the descending side of the rotating filter.

As mentioned hereinbefore, each curtain of fine droplets is provided by a transverse distributor 2 or header such as that disclosed in FIGS. 2 and 3. In this arrangement, the headers are supplied with chilled wash solvent through a plurality of feeder tubes connected with each distributor and provided with suitable valves to control the flow of chilled solvent thereto. Furthermore, to ensure a uniform flow of liquid welling up through the holes in the distributor tubes, it is important that the tubes be maintained substantially horizontal throughout their transverse length and this is provided for by fastening each distributor 2 to screw type level adjusting means suitable for accomplishing this purpose.

In the arrangement of FIG. 1, the six distributor tubes 50 are connected to a suitable manifold 52 which provides chilled wash solvent to the upper surface of the rotating filter, as above described. The chilled wash solvent is preferably filtered prior to passing it to the distributor tubes so as to remove any foreign particles such as rust often found in the system which would tend to plug the solvent distributing holes provided in the upper surface of the distributor pipes. Filtering of the wash solvent is accomplished, for example, in zone 54 to which the chilled wax solvent is supplied by conduit 56. The wax cake on the rotating filter after passing through several regions of solvent wash in alternating degrees of solvent concentration then moves through a zone to which a reverse flow of gas is supplied to lift the wax cake from the surface of the filter so that it can be picked up and removed from the filter by a doctor blade 60. The gas used to blow the wax from the surface of the filter is supplied by conduit 58, as shown in FIG. 1. The wax removed from the surface of the filter by doctor blade 60 is accumulated in collector 62 and is removed as by 64 for further use as desired.

Referring now to FIG. 2, there is shown diagrammatically one of the distributor tubes 50 as provided in FIG. 1. The distributor tube of this figure comprises inlets for wash solvent through pipes 66 and 68 at each end of the tube with a tee inlet connection 70 in the center of distributor 2. This multiple inlet for wash solvent is particularly desirable in order to ensure desired low flow rate of wash solvent within the tube so that the solvent will well up through the small holes or outlets provided along the top center line of the elongated distributor tube. The distributor tube is provided with screw caps at each end which can be removed as desired to clean the tubes of any foreign matter such as rust which would tend to plug the small holes through which the wash solvent passes.

FIG. 3 more specifically shows one end portion of the distributor tube of FIG. 2 and the inlet 68 is shown along with a screw cap 72. In this specific arrangement a plurality of 1/16 inch grooves 74 are provided on a ¼ inch pitch as shown circumscribing the pipe much as a threaded pipe would be and having a flat surface area between each groove.

In the specific arrangement of FIG. 3, a plurality of liquid distributing holes 76 are drilled in the top surface of the pipe throughout the length thereof in the same plane so that there will be a uniform metering of liquid through the holes to the top surface of the distributor pipe for flow about its periphery to form droplets on the bottom side thereof, which discharge from the bottom of the pipe.

In the arrangement of FIGS. 2 and 3, the inlets 66, 68 and 70 are provided in a plane which is about 45° from the vertical so that these inlet pipes will not interfere with the plane of liquid discharged from the distributor holes 76. The tee connection 70 is drilled similarly to the pipe section intermediate to the tee and the screw cap end. Furthermore, the tee may be scored so as to ensure a plurality of confined streams of liquid moving to the bottom of the tee for drop formation.

FIG. 3 shows distributor holes 76 located intermediate to the V grooves of the pipe. However, it is contemplated locating the liquid distributor hole to coincide with the bottom of the V grooves provided in the pipe circumference. It is further contemplated fabricating the distributor pipes with substantially vertical V grooves about the pipe rather than as a pipe thread. Thus any arrangement that is convenient to fabricate a distributor pipe which will provide a relatively dense curtain of droplets in the manner of this invention may be utilized.

Having thus provided a general discussion of the improved method and means of the present invention and described specific examples in support thereof, it is to be understood that no undue restrictions are to be imposed by reason thereof except as defined by the following claims.

We claim:

1. A method for deoiling a wax cake on a rotary filter which comprises:

contacting the ascending wax cake moving out of an oil-wax slurry with a curtain consisting of closely spaced relatively fine solvent droplets falling onto the cake solely due to gravity force throughout the transverse length of said rotating filter, moving said wax cake through a plurality of said fine droplet curtains spaced apart from one another in the direction of rotation, causing solvent from each curtain to flow through said wax cake and displace oil therein, and recovering a wax cake more uniformly free of retained oil throughout the transverse length of said filter.

2. The method of claim 1 wherein the solvent used to form the curtain of droplets is filtered.

3. The method of claim 1 wherein there are at least four curtains of solvent droplets on the ascending side of the wax cake.

* * * * *